US006473825B1

(12) United States Patent
Worley et al.

(10) Patent No.: US 6,473,825 B1
(45) Date of Patent: Oct. 29, 2002

(54) APPARATUS AND METHOD FOR CONTROLLING SECURE COMMUNICATIONS BETWEEN PERIPHERAL COMPONENTS ON COMPUTER BUSES CONNECTED BY A BRIDGE CIRCUIT

(75) Inventors: James F. Worley, Murrieta; Michael J. Blasdel, Escondido; Robert R. Hale, San Diego; Carolyn A. Lynch, San Diego, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/481,331

(22) Filed: Jan. 12, 2000

(51) Int. Cl.⁷ .......................... G06F 13/38; G06F 13/40
(52) U.S. Cl. .................. 710/306; 710/305; 713/200
(58) Field of Search .................. 710/305–317, 710/200; 713/200, 201

(56) References Cited

U.S. PATENT DOCUMENTS

| | | | | |
|---|---|---|---|---|
| 4,540,850 A | * | 9/1985 | Herr et al. | 370/261 |
| 5,335,266 A | * | 8/1994 | Richardson et al. | 379/114.21 |
| 5,809,262 A | * | 9/1998 | Potter | 710/305 |

* cited by examiner

Primary Examiner—Rupal Dharia
(74) Attorney, Agent, or Firm—Antonelli, Terry, Stout & Kraus, LLP

(57) ABSTRACT

An apparatus for and a method of controlling secure communication between peripheral components in a communication system. The security level of each peripheral component address in the communication system is fixed. When a message is communicated, a bus access arbiter (122) detects the address of the originating peripheral component, and an address detector (110, 114) detects the address of the destination peripheral component. An address comparison circuit (116) determines whether the address of the destination peripheral component is an address to which the originating peripheral component is permitted to communicate. The address comparison circuit (116) is responsive to the address of the destination peripheral component being an address to which the originating peripheral component is permitted to communicate by permitting communication of messages from the originating peripheral component. The address comparison circuit (116) is further responsive to the address of the destination peripheral component not being an address to the which the originating peripheral component is permitted to communicate by generating an error signal, preventing communication of further messages from the originating peripheral component.

7 Claims, 6 Drawing Sheets

APPARATUS AND METHOD FOR CONTROLLING SECURE COMMUNICATIONS BETWEEN PERIPHERAL COMPONENTS ON COMPUTER BUSES CONNECTED BY A BRIDGE CIRCUIT

STATEMENT REGARDING FEDERALLY SPONSORED RESEARCH OR DEVELOPMENT

This invention was made with Government support under contract number DAAJ09-91-C-A004 awarded by the United States Army. The Government has certain rights in the invention.

FIELD OF THE INVENTION

The present invention pertains to an apparatus for a method of controlling communication between peripheral components in a communication system. More particularly, the present invention pertains to an improved apparatus for and method of assuring that classified or sensitive messages are not transmitted to peripheral components which do not have the appropriate access authority to receive the messages.

BACKGROUND OF THE INVENTION

Various applications, particularly in a military environment, require secure communication of sensitive or classified information. By way of example, military aircraft must be able to send and receive classified information both between various components within an aircraft and between different aircraft. Information sent between aircraft, for example by radio communication, might be encrypted so as to prevent understanding of the information by someone for whom the information is not intended, but who nevertheless receives the information. Within a single aircraft, however, it is desirable to be able to send messages that are not encrypted between components of the aircraft. Otherwise, it is necessary to have numerous cryptographic units for encrypting and decrypting the messages as they are transmitted from and received by the various components. It is therefore necessary to assure that messages containing sensitive or classified information are not sent to a component that is not authorized to receive such messages. Such a component might transmit the classified or sensitive information to other equipment not authorized to receive the information, which might include equipment outside the aircraft.

In the past, it has been the practice to indicate the security level of a message by means such as a token transmitted with the message, or by placing messages of different security levels on different communication buses. This is not altogether satisfactory since it requires additional equipment to respond to the token, additional buses within the communication system, and input/output software developed to a higher level of assurance.

In addition, such prior art communication apparatuses have required operating systems, processors, and other communication equipment which have been specifically designed for a particular application. This is necessarily expensive. However, it has not previously been possible to use commercial operating systems or processors, since they did not provide the required assurance.

SUMMARY OF THE INVENTION

The present invention is a apparatus for and method of controlling communication between peripheral components in a secure communication system. The present invention permits use of commercial, off-the-shelf operating systems and processors, since it is not necessary to alter the operating systems or processors to permit secure communication of messages.

In accordance with the present invention, the sensitivity level of each peripheral component address in the communication system is fixed. When a message is communicated, the addresses of the originating peripheral component and the destination peripheral component are detected, and it is then determined whether the address of the destination peripheral component is an address to which a peripheral component at the originating address is permitted to communicate. Thus, the destination address must have a sensitivity level equal to or greater than the sensitivity level of the originating address. If not, then communication of further messages from the origination address is prevented, thereby preventing communication of messages of a particular sensitivity level to peripheral components of lower sensitivity level. If the address of the destination peripheral component is an address to which the peripheral component at the originating address is permitted to communicate, then communication of messages from the origination address is permitted to continue.

The apparatus of the present invention includes a first address detector for detecting the address of the originating peripheral component, a second address detector for detecting the address of the destination peripheral component, and an address comparison circuit for determining whether the address of the destination peripheral component is an address to which a peripheral component at the originating address is permitted to communicate. The address comparison circuit is responsive to the address of the destination peripheral component not being an address to the which the peripheral component at the originating address is permitted to communicate by generating an error signal, preventing communication of further messages from the origination address. If the address of the destination peripheral component is an address to which the peripheral component at the originating address is permitted to communicate, transmission of messages from the origination address is permitted to continue.

The originating and destination peripheral addresses might be on the same communication bus. Alternatively, they might be on different buses connected by one or more bridge circuits. The bridge circuit on the bus of the originating address detects the destination address of messages originating at addresses on its bus and determines whether the destination address is an address to which the peripheral component at the originating address is permitted to send a message. Thus, the sensitively level is always checked by the bridge circuit on the bus of the originating address. Consequently, no such check is necessary at the bus of the destination address.

The present invention is particularly applicable for use in communication within military aircraft. However, it is likewise usable in communication within other systems.

BRIEF DESCRIPTION OF THE DRAWINGS

These and other aspects and advantages of the present invention are more apparent from the following detailed description and claims, particularly when considered in conjunction with the accompanying drawings. In the drawings:

DETAILED DESCRIPTION

Figure 1:
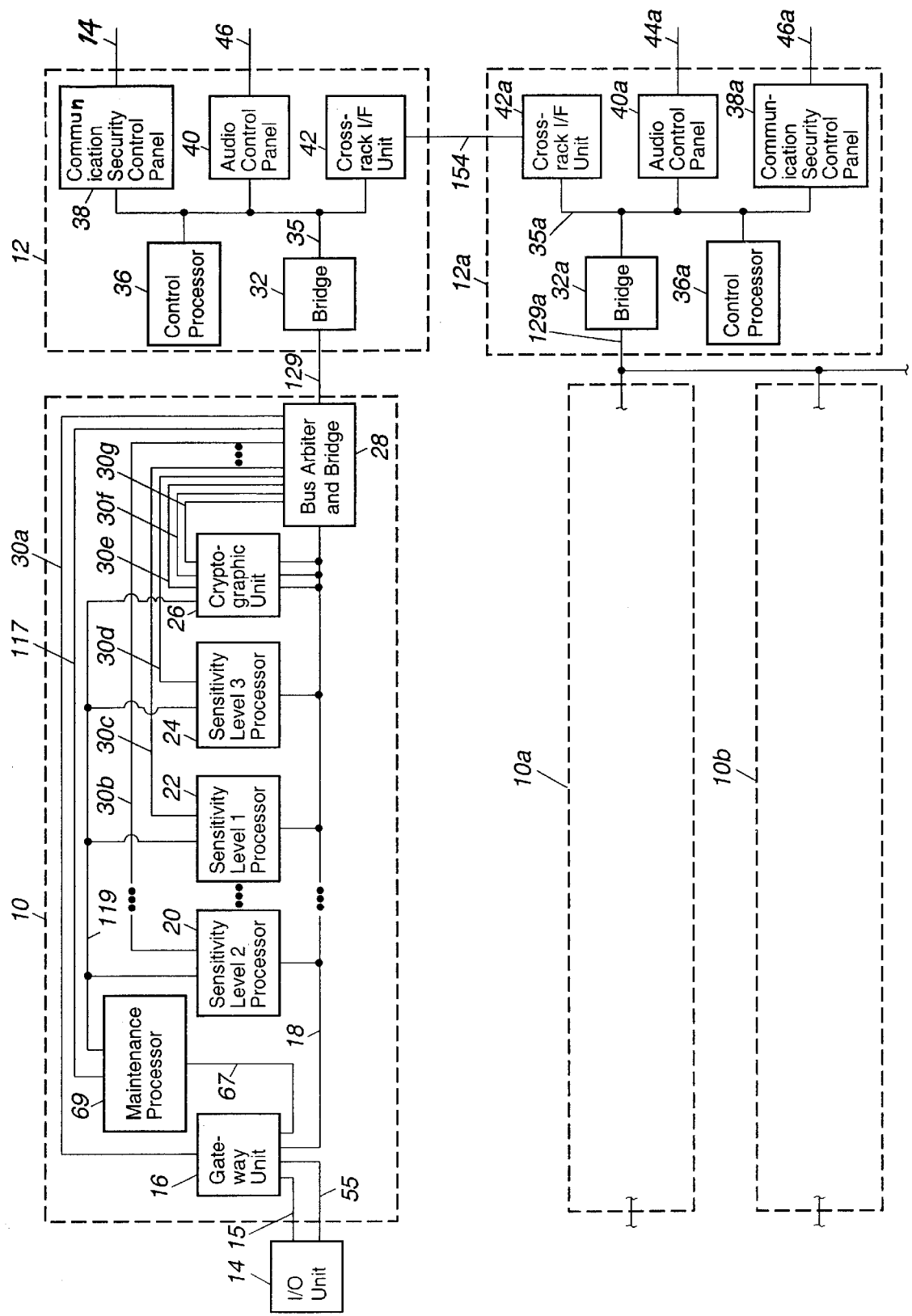
FIG. 1 is a block diagram of a preferred embodiment of an apparatus for controlling communication between peripheral component addresses in a communication system in accordance with the present invention.

FIG. 1 is a block diagram of a communication system in accordance with a preferred embodiment of the present invention. The communication system includes a first data processing unit 10 which is coupled to a first control unit 12. The first control unit 12, in turn, is coupled to a second control unit 12a which is coupled to additional data processing units, depicted in FIG. 1 as data processing units 10a and 10b, although additional data processing units could be connected to control unit 12a, if desired. Likewise, more than one data processing unit could be connected to control unit 12. The several data processing units 10, 10a, 10b, etc., are substantially identical, and so only the details of the data processing unit 10 are depicted in FIG. 1 and described in the following detailed description.

Data processing unit 10 can send and receive communications on bus 15 to and from input/output unit 14, which, by way of example, might include one or more radio receivers or other equipment providing communication, navigation, and identification functions. Within data processing unit 10 bus 15 connects input/output unit 14 to a gateway unit 16. Communication bus 18 connects gateway unit 16 to a plurality of processors within data processing unit 10. FIG. 1 illustrates communication bus 18 connected to processors 20, 22, and 24; however, any number of processors might be included. Communication bus 18 is also connected to a cryptographic unit 26 and to a bus arbiter and bridge circuit 28. Communication bus 18 permits communication of both confidential or sensitive messages and non-sensitive messages among gateway unit 16, processors 20, 22, 24, etc., cryptographic unit 26, and bus arbiter and bridge circuit 28 within data processing unit 10.

The processors 20, 22, 24, etc., may be of identical design with identical operating systems. The address of each processor is assigned a sensitivity level, indicating the sensitivity level of messages a processor at that address is authorized to receive. There may be any number of sensitivity levels, as desired. FIG. 1 illustratively depicts processor 20 as being at a "sensitivity level 2" address, processor 22 as being at a "sensitivity level 1" address, and processor 24 as being at a "sensitivity level 3" address, indicating that a processor at each of these addresses is authorized to receive messages having a sensitivity level up to the indicated level, but is not authorized to receive messages of a greater sensitivity level.

Bus arbiter and bridge circuit 28 has separate connections 30a–30g to gateway unit 16, to each of the processors 20, 22, 24, etc., and to cryptographic unit 26 within data processing unit 10. Cryptographic unit 26 has a separate address on bus 18 for each sensitivity level, thus being depicted in FIG. 1 as having three connections to bus 18, as well as three connections 30e, 30f, and 30g to bus arbiter and bridge circuit 28, separate ones for each of the sensitivity levels 1, 2, and 3.

Figure 2:
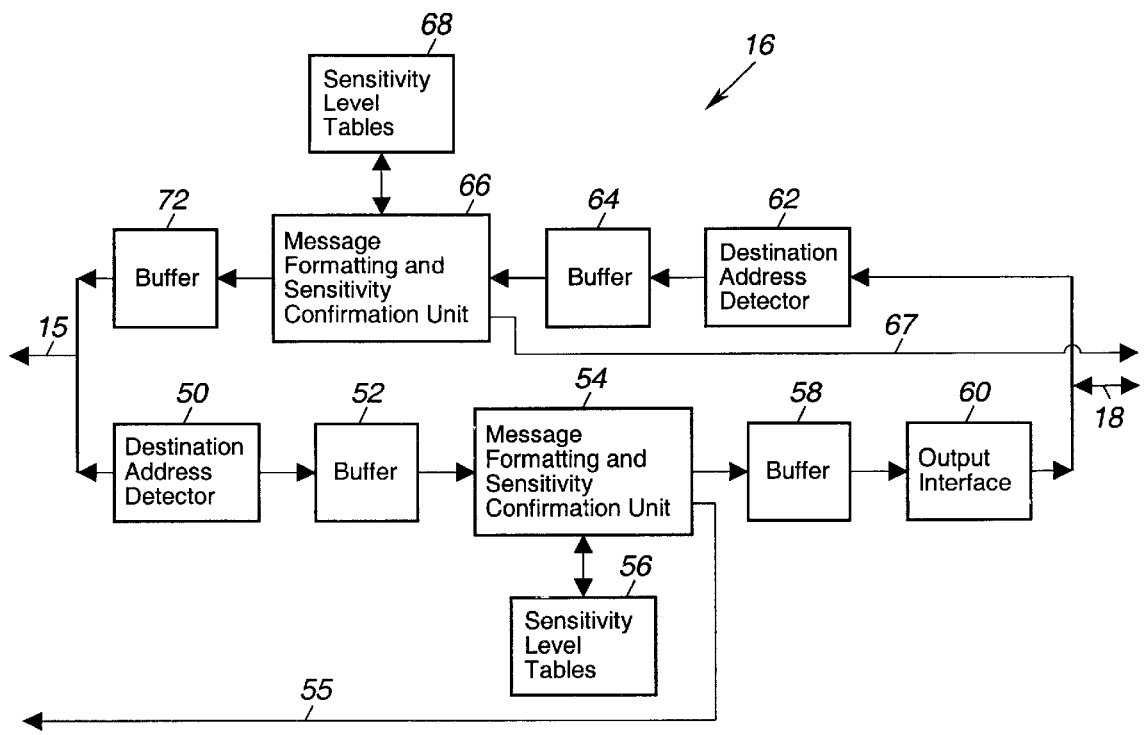
FIG. 2 is a block diagram of a preferred embodiment of a gateway unit suitable for incorporation into the apparatus of FIG. 1 in accordance with the present invention.
Figure 3:
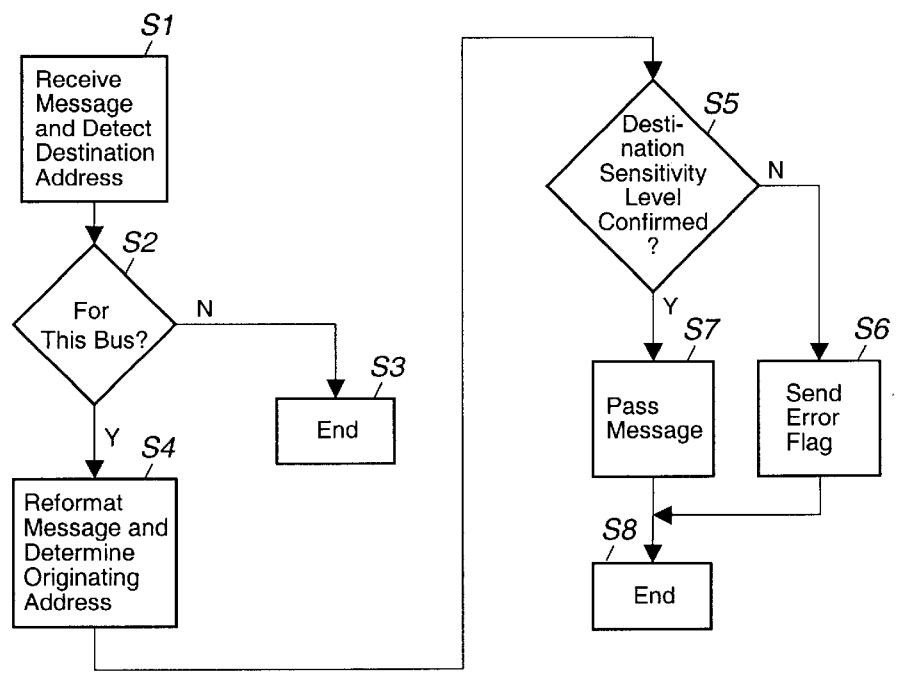
FIG. 3 is a flowchart illustrating operation of the gateway unit of FIG. 2 in accordance with the present invention.

FIG. 2 is a block diagram of a preferred embodiment of gateway unit 16 within data processing unit 10, and FIG. 3 illustrates its operation. The various signals which pass between input/output unit 14 and gateway unit 16 either are not sensitive or are encrypted. Each received signal includes, in addition to a message, a destination address indicating the intended destination of the message, and a token indicating the originating address of the message. The term "message" is sometimes used hereinafter to refer to the combination of the address, token, and message.

Within gateway unit 16, the input signals on bus 15 are applied at step S1 to destination address detector 50 which detects the destination address. If destination address detector 50 determines at step S2 that a received message is addressed to a destination for which communication does not pass through data processing unit 10, then the process ends at step S3. If at step S2 destination address detector 50 determines that the received message is addressed to a destination within data processing unit 10, or to a destination for which communication passes through data processing unit 10, then destination address detector 50 applies the message to buffer 52.

Other aircraft or systems which send messages through input/output unit 14 to data processing unit 10, or which receive messages through input/output unit 14 from data processing unit 10, have address maps which differ from the address map of the system of FIG. 1. Additionally, the received messages may be in a different format than that utilized by the system of FIG. 1. By way of example, messages on bus 15 from input/output unit 14 might have 16 bits, while messages on bus 18 have 32 bits. Likewise, the address information may be in different formats. The system that sends a message through input/output unit 14 to data processing unit 10 has determined that the destination address is authorized to receive messages of the sensitivity level of the sent message. Buffer 52 applies the received message to message formatting and sensitivity confirmation unit 54. There in step S4 the message is reformatted, including reformatting the destination address in accordance with the address map of the system of FIG. 1. Message formatting and sensitivity confirmation unit 54 also detects the token within the message to determine the originating address and provides a sideband signal indicating the sensitivity level of that originating address. In step S5, message formatting and sensitivity confirmation unit 54 confirms that the destination address has the proper sensitivity level to receive a message from the originating address, thus assuring that no error occurred in the address reformatting to the address map of the system of FIG. 1 that would compromise confidentiality. If the reformatted destination address is not authorized to receive a message of the indicated security level, then in step S6 message formatting and sensitivity level conformation unit 54 applies an error flag or message on line 55 to input/output unit 14, and the process ends in step S8. If the destination address is confirmed to have the proper sensitivity level, then message formatting and sensitivity level confirmation unit 54 stores the reformatted message and sideband signal in buffer 58. Output interface unit 60 then requests access to bus 18, and when that access is granted passes the message and sideband signal from buffer 58 to communication bus 18 in step S7. The process then ends in step S8 until receipt of the next message. Referring to FIGS. 1 and 2, if the message in buffer 58 is for a processor within data processing unit 10, then bus 18 applies the message from output interface 60 to that processor. If the message is for a destination beyond data processing unit 10, then bus 18 applies the message and sideband signal to bus arbiter and bridge circuit 28 for subsequent transmission.

In a preferred embodiment, in order to confirm in step S5 that the destination address has the proper sensitivity level, message formatting and sensitivity confirmation unit 54 is connected to sensitivity level tables 56 which include a look-up table for each originating address from which communication can be received by gateway unit 16. Each look-up table lists the addresses of peripheral units or other destinations to which the corresponding originating address is permitted to send communications, based on the sensitivity levels of the originating address and the destination address. Message formatting and sensitivity confirmation unit 54 determines whether the destination address is on the look-up table of the originating address.

Likewise, when gateway unit 16 receives a message on bus 18 for transmission on bus 15 to input/output unit 14, in step S1 the message is received by destination address detector 62 which detects the message destination address. In step S2 destination address detector 62 determines whether the destination address is an address for which communication is to pass through gateway unit 16. If not, then in step S3, the process ends. If the message is to pass through gateway unit 16, then the message is stored in buffer 64, and in step S4 message formatting and sensitivity level confirmation unit 66 reformats the message as necessary, determines the originating address, and consults the corresponding one of the sensitivity level look-up tables 68 to confirm in step S5 that the destination address has the proper sensitivity level to receive the message. If not, then in step S6 message formatting and sensitivity level confirmation unit 66 applies an error signal on line 67 to a maintenance processor 69 (FIG. 1) within data processing unit 10, causing the maintenance processor to take appropriate action, such as applying a signal on bus 119 to the peripheral unit at the originating address to prohibit further communications from that address. The process then ends at step S8. If the message was from a component which communicates through control unit 12, then the message is accompanied by a sideband signal indicating the sensitivity level of the originating address, and message formatting and sensitivity level confirmation unit 66 confirms that the destination address has the proper sensitivity level based on the sideband signal, rather than on the originating address. If in step S5 it is confirmed that the destination address has the proper sensitivity level, then message formatting and sensitivity confirmation unit 66 adds a token to the message to indicate the destination address, stores the message in buffer 72 and requests access to bus 15. When that access is granted, then in step S7 the message is applied to bus 15 for passage to input/output unit 14. The process then ends in step S8 to await receipt of the next message on bus 18.

Figure 4:
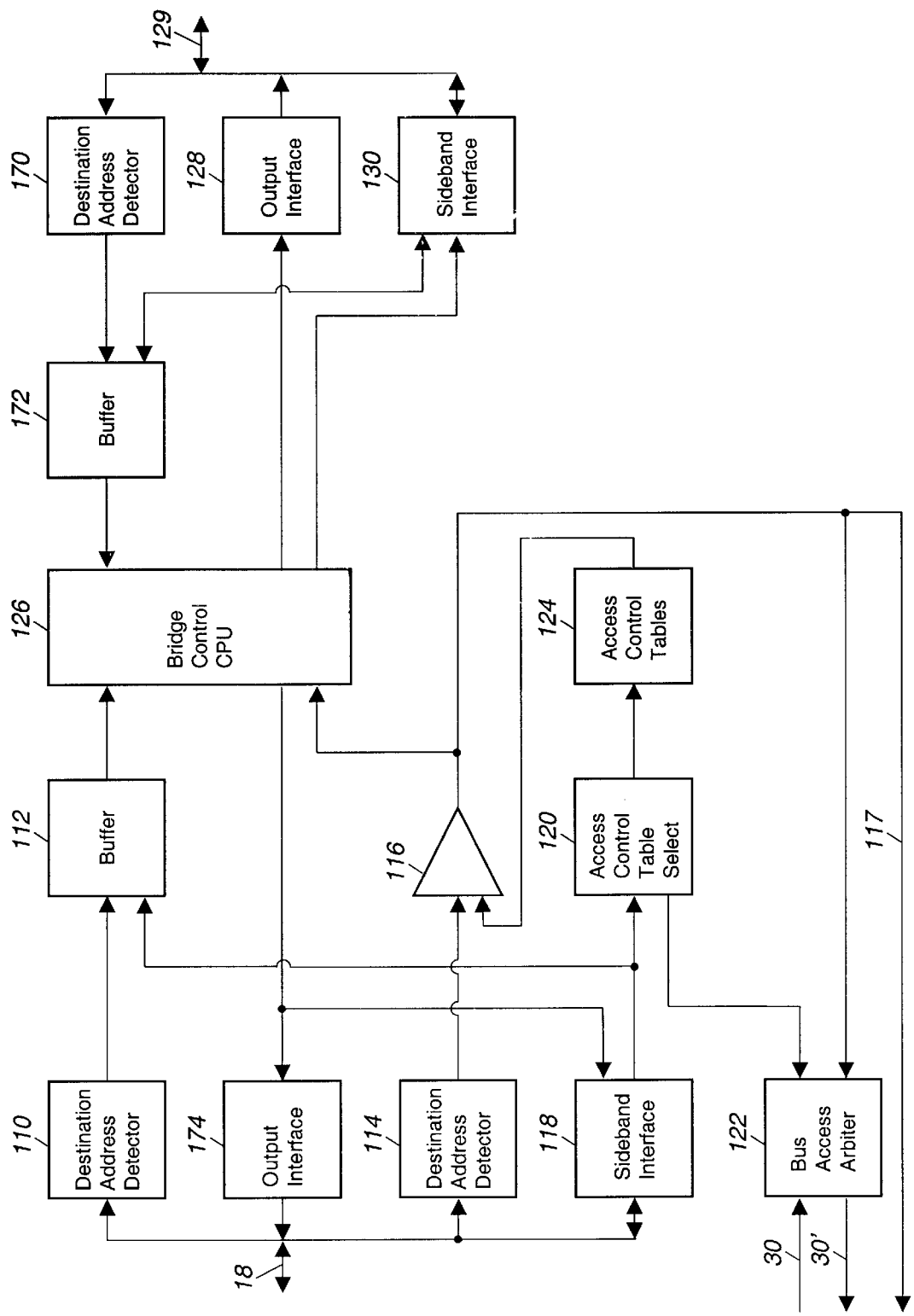
FIG. 4 is a block diagram of a preferred embodiment of a bus arbiter and bridge circuit suitable for incorporation into the apparatus of FIG. 1 in accordance with the present invention.
Figure 5:
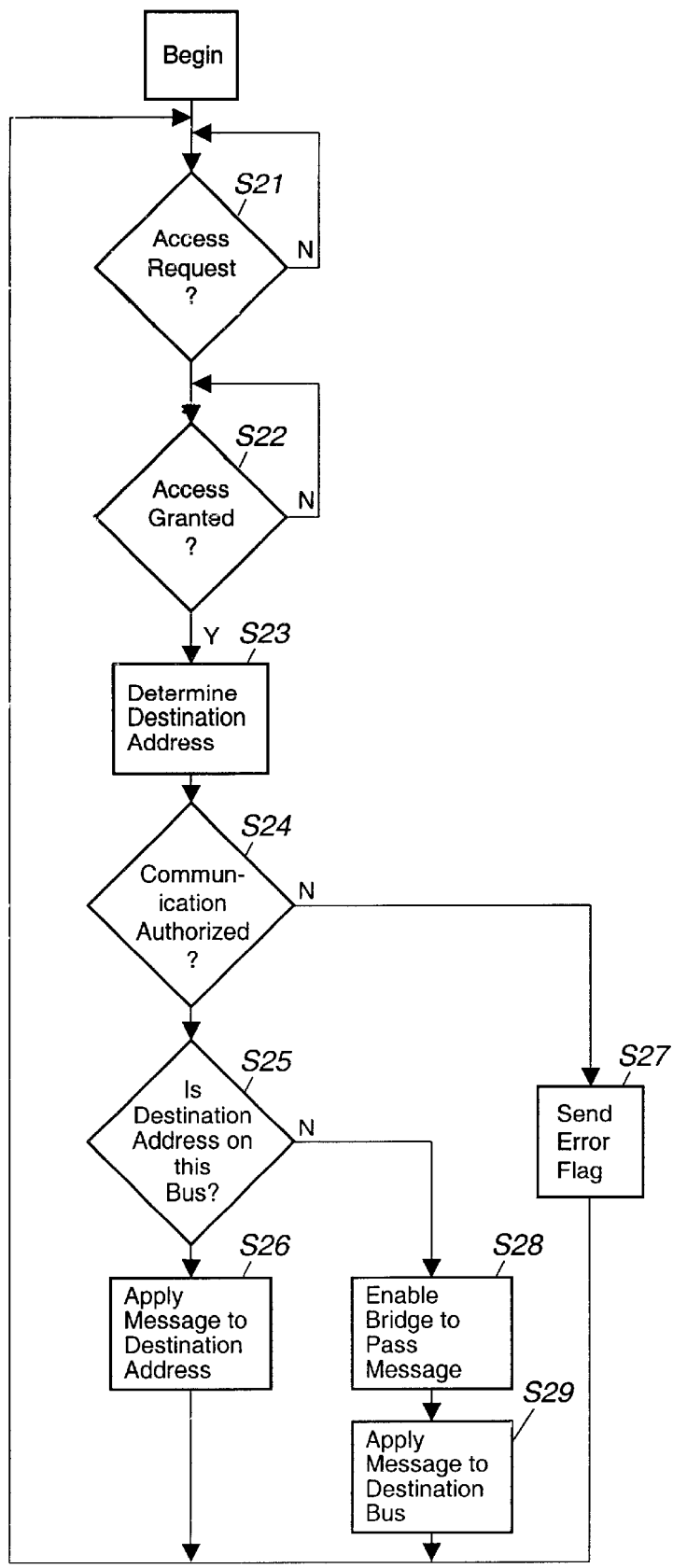
FIG. 5 is a flowchart illustrating operation of the bus arbiter and bridge circuit of FIG. 4 in accordance with the present invention.

FIG. 4 depicts a preferred embodiment of bus arbiter and bridge circuit 28, and FIG. 5 illustrates its operation. When one of the processors 20, 22, 24, etc. desires to send a message to another of the processors 20, 22, 24, etc. on the same bus 18, the originating processor in step S21 applies a bus access request signal on line 30 to bus access arbiter 122. In step S22, when the bus is available, arbiter 122 returns an access granted signal on line 30', and so the requesting peripheral unit applies the message to bus 18. A bus access request line 30 and an access granted line 30' are included in each line 30a–30g of FIG. 1. Bus access arbiter 122 applies the address of the originating processor to access control table select circuit 120. Access control tables 124 include a look-up table for the address of each processor 20, 22, 24, etc. Each look-up table lists the addresses of peripheral units throughout the entire system to which the processor at the corresponding originating address is permitted to communicate. Access control table select circuit 120 selects the look-up table of the originating processor address, and the addresses to which the processor at that address is permitted to communicate are applied to comparison circuit 116.

Messages on bus 18 are applied to destination address detector 114 which in step S23 determines the message destination address and applies it to comparison circuit 116. If comparison circuit 116 determines in step S24 that the message destination address is on the look-up table for the address of the originating processor, indicating that the processor at that originating address is permitted to communicate with the destination address, then comparison circuit 116 applies a signal to bus access arbiter 122 to indicate that the communication is authorized, freeing bus access arbiter 122 to await the next bus access request. In step S25, destination address detector 110 also determines whether the destination address is on bus 18 within data processing unit 10. If so, then in step S26 the originating processor applies the message onto bus 18 to the destination processor and returns to step S21 to await the next bus access request. If in step S24, comparison circuit 116 determines that the message destination address is not on the look-up table for the originating processor address, then in step S27 comparison circuit 116 generates an error signal or flag which is applied by bus 117 to maintenance processor 69 (FIG. 1) which then applies a signal on bus 119 to the processor at the originating address to prevent further transmissions from that address.

When gateway unit 16 or one of the processors 20, 22, 24, etc. within data processing unit 10 applies a message to bus 18 for a peripheral unit outside data processing unit 10, the message is applied by bus 18 to destination address detector 110 within bus arbiter and bridge circuit 28, as well as to destination address detector 114. In addition, the sideband signal indicating the sensitivity level of the originating address is applied by bus 18 to sideband interface 118. As set forth above with regard to messages between two peripheral components within data processing unit 10, destination address detector 114 applies the destination address to comparison circuit 116. When the message is going beyond data processing unit 10, the sideband signal from interface 118 is applied to access control table select circuit 120, and this signal is given priority over the originating address indication from bus access arbiter 122. Access control table select circuit 120 selects the corresponding look-up table from access control tables 124 and applies it to comparison circuit 116. In step S24, comparison circuit 116 determines whether the destination address is in the look-up table, indicating that the processor at the originating address is permitted to transmit messages to the destination address. If comparison circuit 116 determines that transmission of the message to the destination address is permitted, then comparison circuit 116 applies an enable signal to bridge control CPU 126 and clears bus access arbiter 122 to await the next bus access request. If in step S25, destination address detector 110 determines that the destination address is not on the bus 18 of data processing unit 10, destination address detector 110 stores the message in buffer 112 and sideband interface 118 stores the sensitivity sideband signal in buffer 112. If desired, destination address detectors 110 and 114 could be incorporated into a single address detector which then applies the message to buffer 112 and the destination address to comparison circuit 116. In step S28 bridge control CPU 126 receives the enable signal from comparison circuit 116 and, through output interface 128, requests access to bus 129. When that access is granted, then in step S29 the bridge control CPU applies the message from buffer 112 through output interface 128 to output bus 129 and the sensitivity sideband signal from buffer 112 through sideband interface unit 130 to line 129.

If the message is for a unit connected to control unit 12a (FIG. 1), then the message and the sensitivity sideband signal on bus 129 are applied to control unit 12 in which they are applied through bridge 32 to bus 35 which applies them to cross-rack interface unit 42. Bridge circuit 32 is also connected by bus 35 to other components within control unit 12, such as a control processor 36, a communication security control panel 38, and an audio control panel 40. Communication security panel 38 is coupled by line 44 to communication equipment within the aircraft or other system. Similarly, audio control panel 40 is connected by line 46 to audio equipment within the aircraft or other system. Cross-rack interface unit 42 within control unit 12 is connected by bus 154 to cross-rack interface unit 42a within control unit 12a. The corresponding components within data processing units 10a, 10b, etc., are connected by bus 129 to the bridge circuit 32a and control processor 36a of control unit 12a.

Figure 6:
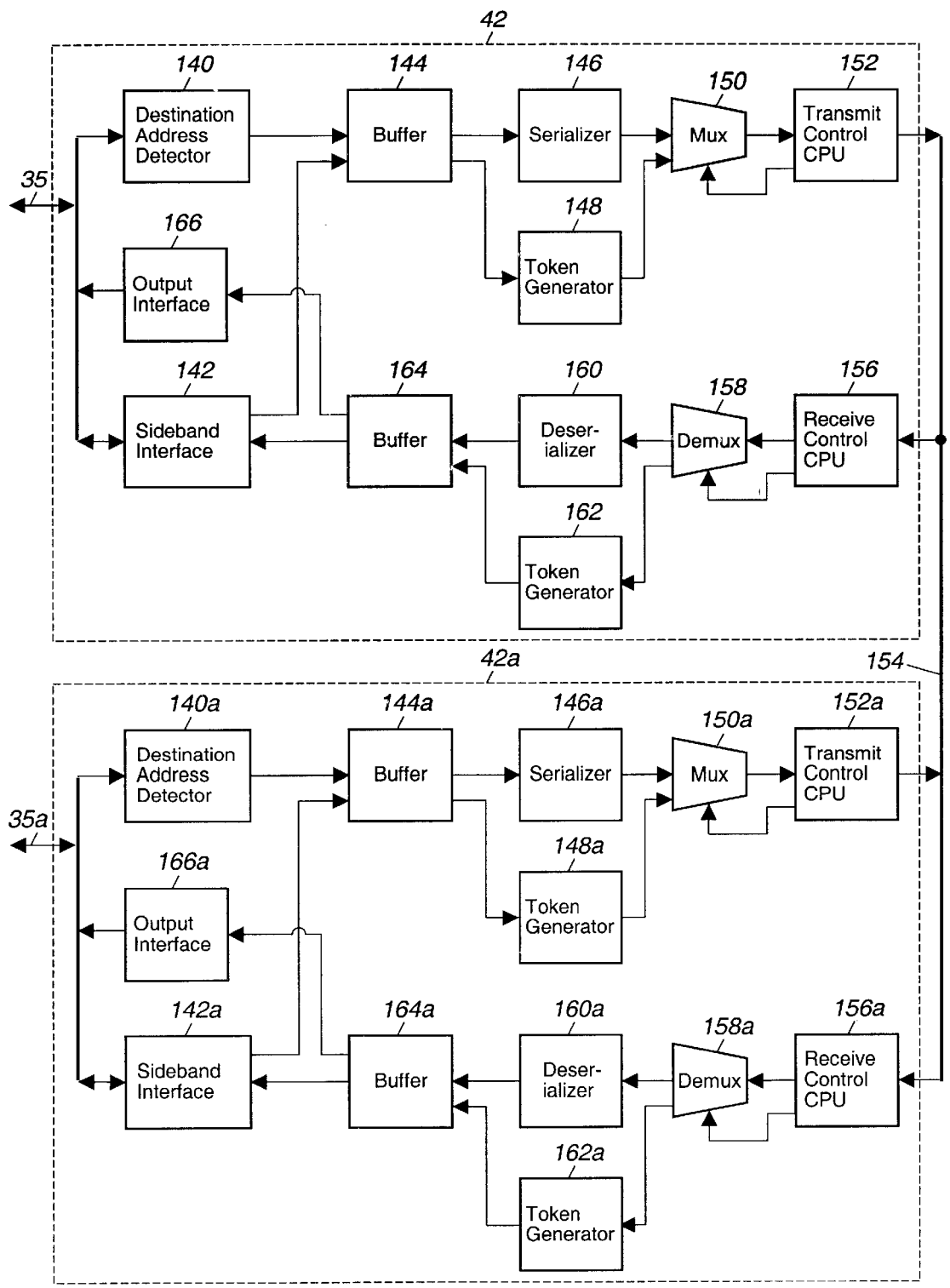
FIG. 6 is a block diagram of a preferred embodiment of cross-rack interface units suitable for incorporation into the apparatus of FIG. 1 in accordance with the present invention.
Figure 7:
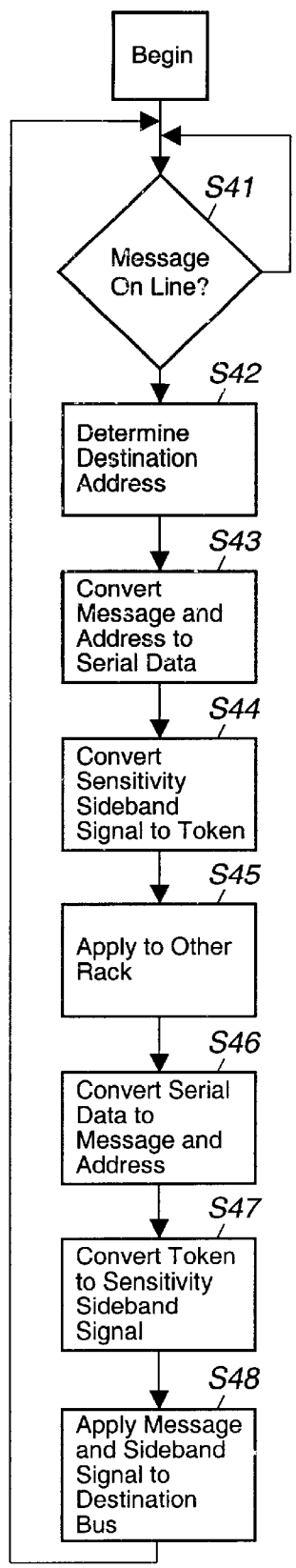
FIG. 7 is a flowchart illustrating operation of the cross-rack interface units of FIG. 6 in accordance with the present invention.

FIG. 6 is a block diagram of a preferred embodiment of cross-rack interface unit 42 and cross-rack interface unit 42a, and FIG. 7 illustrates their operation. In step S41, if a message and a sensitivity sideband signal are on bus 35, the message is applied to destination address detector 140, while the sensitivity sideband signal is applied to sideband interface unit 142. Destination address detector 140 detects the message destination address in step S42. The message, including the destination address, is applied by destination address detector 140 to buffer 144. The sensitivity sideband signal is also applied to buffer 144 by sideband interface unit 142. Buffer 144 applies the message and destination address to serializer 146, which in step S43 converts the message and destination address into serial data. Buffer 144 also applies the sensitivity sideband signal to token generator 148, which in step S44 converts the sensitivity sideband signal into a token.

In step S45 the serialized message and destination address and the token are applied from cross-rack interface unit 42 to cross-rack interface unit 42a. The outputs of serializer 146 and token generator 148 are applied to the two signal inputs of multiplexer 150. Transmit control CPU 152 applies a control signal to the control input of multiplexer 150 to properly multiplex the token with the serial data. The multiplexed token and serial data from multiplexer 150 are applied by CPU 152 to cross-rack bus 154 from which they are applied to receive control CPU 156a within cross-rack interface unit 42a.

The multiplexed signal includes the destination address, the token, and the message. Receive control CPU 156a applies the multiplexed signal to the signal input of demultiplexer 158a and applies a control signal to the control input of the demultiplexer. As a consequence, the destination address and message are applied to deserializer 160a, while the token is applied to token detector 162a. In step S46 deserializer converts the serial data back into the message and destination address. In step S47 token detector 162a converts the token into the sensitivity sideband signal. The outputs of deserializer 160a and token detector 162a are applied to buffer 164a. Buffer 164a applies the destination address and the message to output interface unit 166a which requests access to bus 35, and when that access is granted in step S48 applies the destination address and message to bus 35a for application to bridge circuit 32a within control unit 12a. Likewise, in step S48 buffer 164a applies the sensitivity sideband signal to sideband interface unit 142a which applies it on bus 35a to bridge circuit 32a within control unit 12a. The process then returns to step S41 to await the next message.

Bridge circuit 32 is similar to bridge circuit 28, with bus 35 in place of bus 18. Cross-rack interface unit 42 is the originating address for signals passed from it to bridge circuit 32. Since cross-rack interface unit 42 handles both sensitive and non-sensitive messages, the sensitivity level is indicated by the sideband signal.

The message and sensitivity sideband signal are applied on bus 129 to the bus arbiter and bridge circuit within the data processing unit of the destination address for application to the destination bus in step S29 (FIG. 5) and then application by that bus to the destination address. Thus, if bridge circuit 32 in control unit 12 applies a message and sensitivity sideband signal on bus 129 to bus arbiter and bridge circuit 28 in data processing unit 10, the destination address and message are applied to destination address detector 170 (FIG. 4) which determines that the message is for a peripheral component in data processing unit 10, and so stores the destination address and message in buffer 172. The sensitivity sideband signal is applied by bus 129 to sideband interface unit 130 which stores it in buffer 172. Bus control CPU 126 then requests access to bus 18, and when bus access arbiter 122 gives that access, bridge control CPU 126 applies the destination address and message to output interface 174 which, in turn, applies them to bus 18 for communication to the destination address.

If the message is for a destination address coupled to the communication system by input/output unit 14 (FIG. 1), bridge control CPU 126 applies the sensitivity sideband signal through sideband interface 118 to bus 18 which then applies both the message and the sensitivity sideband signal to gateway unit 16. The gateway unit then reformats the message and passes the reformatted message to input/output unit 14, as described above with reference to FIGS. 2 and 3. If the sensitivity level of the destination address is not confirmed by message formatting and sensitivity confirmation unit 66, the unit can respond by not applying the message to buffer 72, since maintenance processor 69 in data processing unit 10 cannot affect an originating processor outside unit 10.

If a peripheral component in data processing unit 10a originates a message for a peripheral component in data processing unit 10b, so that the message does not need to go through control unit 12a, the message, destination address, and sensitivity sideband signal are communicated directly from bus arbiter and bridge circuit 28a in data processing unit 10a to bus arbiter and bridge circuit 28b in data processing unit 10b.

When it is determined that the destination address is an address to which the originating peripheral component is not authorized to communicate, maintenance processor 69 can prevent communication of further messages by causing the first peripheral component to shut down, by prohibiting bus access arbiter 122 from providing a further access request granted signal on line 30', by preventing bridge control CPU 126 from applying further messages to output interface 174 or preventing the output interface from passing further messages, or by any other suitable technique.

Because the sensitivity level is based on the addresses of the originating and destination addresses, commercial operating systems and processors can be used, and identical processors can be used for both sensitive and non-sensitive messages, thus avoiding the expense of different and custom designed components. It is thus seen that the present invention provides an improved, economical apparatus and method for controlling communication between peripheral components in a communication system. Although the present invention has been described with reference to preferred embodiments, various rearrangements, alternations, and substitutions could be made, and still the result could be within the scope of the invention.

What is claimed is:

1. A method of controlling communication between a first peripheral component located on a first computer bus and a second peripheral component located on a second computer bus, the first and second computer buses being connected by a bridge circuit, said method comprising the steps of:

(a) in response to placing onto the first computer bus of a message from the first peripheral component addressed to the second peripheral component, determining the addresses of the first and second peripheral components;

(b) determining the bus on which the second peripheral component is located;

(c) if the second peripheral component is located on the second computer bus, applying the message to the bridge circuit;

(d) determining whether the address of the second peripheral component is an address to which the first peripheral component is permitted to communicate;

(e) if the address of the second peripheral component is not an address to which the first peripheral component is permitted to communicate, preventing communication of further messages from the first peripheral component; and (f) if the address of the second peripheral component is an address to which the first peripheral component is permitted to communicate, permitting the bridge circuit to pass messages from the first peripheral component.

2. A method as claimed in claim 1, wherein step (b) comprises determining whether the address of the second peripheral component is on a listing of addresses of peripheral components to which the first peripheral component is permitted to communicate.

3. A method as claimed in claim 1, wherein step (b) comprises determining whether the address of the second peripheral component is in a look-up table of addresses of peripheral components to which the first peripheral component is permitted to communicate.

4. A method as claimed in claim 1, wherein step (c) comprises shutting down the first peripheral component.

5. A method as claimed in claim 1, wherein step (c) comprises sending an error message to a maintenance processor to cause the maintenance processor to shut down the first peripheral component.

6. Apparatus for controlling communication between a first peripheral component located on a first computer bus and a second peripheral component located on a second computer bus, said apparatus comprising:

a bridge circuit connecting the first computer bus and the second computer bus;

a first address detector for detecting the address of the first peripheral component;

a second address detector for detecting the address of the second peripheral component and the bus on which the second peripheral component is located; and an address comparison circuit for determining whether the address of the second peripheral component is an address to which the first peripheral component is permitted to communicate, said address comparison circuit being responsive to the address of the second peripheral component not being an address to which the first peripheral component is permitted to communicate by preventing passage of further messages from the first peripheral component through the bridge circuit, and being further responsive to the address of the second peripheral component being an address to which the first peripheral component is permitted to communicate by permitting passage of messages from the first peripheral component through the bridge circuit.

7. Apparatus as claimed in claim 6, wherein said address comparison circuit comprises a look-up table of addresses of peripheral components to which the first peripheral component is permitted to communicate, and a comparer for comparing the address of the second peripheral component with addresses in said look-up table.

\* \* \* \* \*